(12) United States Patent
Seiersen

(10) Patent No.: US 7,498,778 B2
(45) Date of Patent: Mar. 3, 2009

(54) ORING CIRCUIT

(75) Inventor: Ole Steen Seiersen, Horsholm (DK)

(73) Assignee: International Rectifier Corporation, El Segundo, CA (US)

( * ) Notice: Subject to any disclaimer, the term of this patent is extended or adjusted under 35 U.S.C. 154(b) by 300 days.

(21) Appl. No.: 10/526,174

(22) PCT Filed: Sep. 15, 2003

(86) PCT No.: PCT/DK03/00595

§ 371 (c)(1),
(2), (4) Date: Mar. 14, 2005

(87) PCT Pub. No.: WO2004/025801

PCT Pub. Date: Mar. 25, 2004

(65) Prior Publication Data

US 2006/0044709 A1    Mar. 2, 2006

(30) Foreign Application Priority Data

Sep. 16, 2002    (DK) .............................. 2002 01361

(51) Int. Cl.
*G05F 1/575* (2006.01)
*H02J 1/10* (2006.01)
(52) U.S. Cl. ...................... 323/269; 323/274
(58) Field of Classification Search ........... 323/268, 323/269, 271, 272, 274, 275, 273; 307/51; 363/65
See application file for complete search history.

(56) References Cited

U.S. PATENT DOCUMENTS

| | | | | |
|---|---|---|---|---|
| 3,558,892 A | * | 1/1971 | Seeley | ...................... 250/205 |
| 4,293,812 A | * | 10/1981 | Kubach et al. | ............... 323/272 |
| 4,490,779 A | * | 12/1984 | Minks | ......................... 363/48 |
| 4,791,349 A | * | 12/1988 | Minks | ......................... 323/266 |
| 6,177,783 B1 | * | 1/2001 | Donohue | ..................... 323/272 |
| 6,301,133 B1 | | 10/2001 | Cuadra et al. | |
| 6,800,962 B2 | * | 10/2004 | Bahl et al. | ..................... 307/52 |

FOREIGN PATENT DOCUMENTS

| | | |
|---|---|---|
| DE | 39 30 091 A1 | 3/1991 |
| DE | 40 25 718 A1 | 2/1992 |
| EP | 0 495 042 B1 | 4/1996 |
| EP | 0 744 683 A1 | 11/1996 |

* cited by examiner

*Primary Examiner*—Gary L Laxton
(74) *Attorney, Agent, or Firm*—Ostrolenk, Faber, Gerb & Soffen, LLP

(57) ABSTRACT

A method and a circuit comprising an electrically controlled transistor element (303) configured for conveying a current from an input terminal (300) to an output terminal (320), wherein the current is of a magnitude belonging within a pre-determined current range; and a control circuit configured for controlling said transistor element is such a manner that the transistor element (303) is controlled to produce a pre-selected voltage drop across the transistor element independently of the traversing current. Hereby an extremely effective circuit is provided that has high efficiency for transporting large current values form a supply module to a power consuming module and hence the option is provided of substituting the circuit according to the invention in an active system; a so-called hot swap. The circuit can also easily be dimensioned to a desired application by adding a number of transistor elements in parallel.

13 Claims, 3 Drawing Sheets

ORING CIRCUIT

Figure 1:
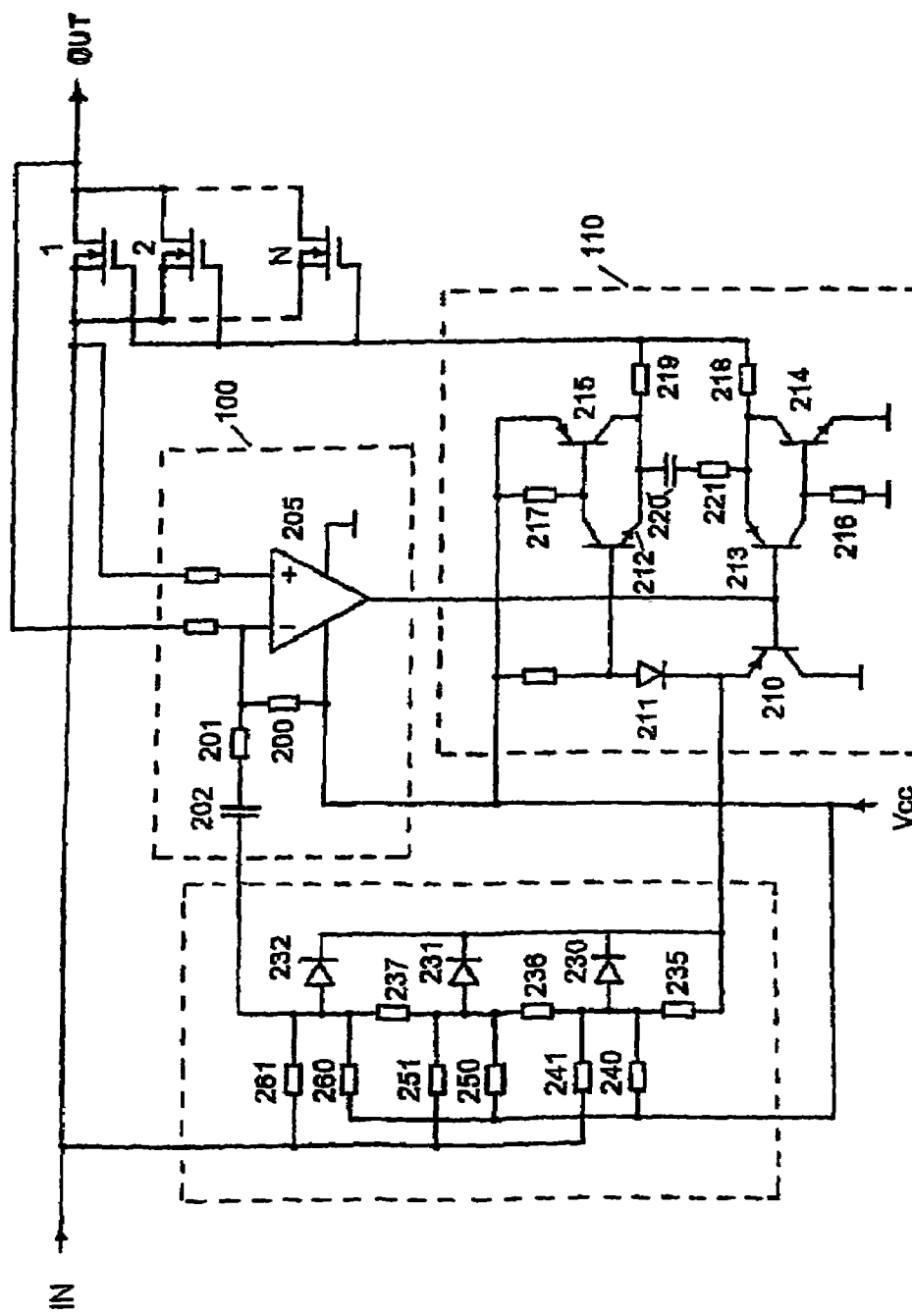

The invention relates to a circuit configured for coupling a number of power-supplying modules to a common point, said circuit comprising an electrically controlled transistor element configured for conducting a current of a magnitude belonging within a predetermined range; a device for detecting the direction of the current; and a control circuit configured for controlling said transistor element in such a manner that a current coming from the common point to one of said modules is prevented.

Furthermore, the invention relates to a method of controlling an electrically controlled transistor element configured for conducting a current from an input to an output in accordance with the invention.

In power supply modules it is known to let a number of modules of a system be used in parallel either to obtain improved reliability or to obtain increased power capacity and to enable exchange of modules during operation without affecting the systems supplied with power by the modules. This is known by the term "Hot swapping".

In those cases the modules are nearly always provided with an ORing circuit, most often in the form of a Schottky-diode in the output, such that any short circuit internally of a module is isolated to that module, the Schottky diode blocking reverse currents in order not to harm the system connected thereto and peripheral modules, if any, and thereby to protect the overall system. An ORing circuit is a term that covers a configuration of a number of these diodes that are interconnected in parallel, typically used in redundant power supply systems for increasing system reliability.

This is also used to advantage in systems where modules can be exchanged in operation (hot swap), the ORing diode eliminating the coupling current impulse that would otherwise occur when a module with discharged output capacitor are suddenly connected into an active system.

ORing diodes involve a loss that was previously accepted in supply sources for voltages around 5V and above; the voltage loss across a Schottky diode of about 0.5V having entailed a loss of maximally 10%, which was accepted till this day. Now, Schottky-diodes can be manufactured with a cut-in voltage drop of about 0.25V which has, of course, given rise to development of supply sources having even better performance.

As the development of digital circuit is refined, a tendency becomes apparent in respect of using very low operating voltages in order to ia minimize the development of heat, waste power and resource consumption, etc. This makes high demands to the supply sources of the circuits since the currents are increased in pace with the supply voltages decreasing.

Therefore, this mentioned diode technology is no longer sufficient for future supply sources that are required to supply voltages as low as about 1V. At such low voltages even a loss of only 0.25V becomes unacceptable and therefore alternative circuits have been developed that have transistor elements comprising current values such as eg MOSFET transistors that are able to replace said Schottky-diodes.

In an inactive MOSFET transistor, ie one not having an applied voltage on the transistor gate, the body diode of the transistor will behave approximately like a conventional diode; exhibiting, however, a considerably larger voltage drop than a Schottky-diode. When, on the other hand, a MOSFET transistor is activated it may, by full scale drive on its gate, reduce the voltage drop to a loss across a typically very low Ohmic resistance, viz the $R_{DSon}$.

For as long as a MOSFET transistor is controlled actively it may be passed by current coming from both directions. However, very often it is unacceptable that a reverse current, a so-called fault current, runs from a system into a supply module, and therefore it is necessary to provide measures for driving the MOSFET transistor in question in inactive state if a fault current is detected. A solution is known, wherein a control circuit measures the current voltage drop on both sides of such ORing circuit of MOSFET transistors in order to thereby be able to determine whether the two voltages are identical, following which such decision may entail that the transistor current circuit is regulated in either a closed or an open state.

In order to be able to emulate the ability of a diode to block reverse currents in the circuit at an almost instantaneous rate, an active MOSFET transistor requires an extremely intelligent control circuit that may, with great accuracy, measure the current through the circuit and in case the current is reverse it drives the transistor in an inactive state with a corresponding, almost instantaneous rate.

Solutions that only partially emulate the Schottky-diode are widely used for solving the problem of hot swapping. A control circuit measures the voltage on both sides of the ORing circuit and does not ramp up the gate voltage until the module has ramped up its output voltage to a level, where there is no longer any difference in voltage on the input and output terminals of the ORing circuit. Hereby coupling current impulses are avoided and a certain kind of error detection is achieved, since a newly connected module will not be able to ramp up its output voltage if an internal short-circuit is already in existence and, consequently, nor will it activate the gate of the MOSFET-ORing circuit. Therefore the circuit remains inactive and serves as a perfect diode. However, the circuit is unable to protect against an internal short-circuit that occurs during operation; rather only against short-circuits that are already in existence before the module is hot swapped.

U.S. Pat. No. 6,301,133 describes a circuit that measures a traversing current in a MOSFET transistor by using its $R_{DSon}$ as measurement resistor. The circuit is a comparator circuit that measures only in which direction the current runs and is configured with a threshold value that allows a certain volume of reverse current before the comparator and brings the MOSFET transistor to inactive state and thereby provides an interruption like in the blocking direction of a conventional diode. It is necessary to allow a certain fault current due to a very low signal level that entails a fairly considerable measurement uncertainty.

In the circuit described a trigger level was selected of −45 A, a very high value that will occur only due to a suddenly occurring internal short-circuit. This is indeed the object of this circuit; to be able to detect precisely that kind of errors.

The described prior art circuit presupposes that the power conversion as such in the module is unidirectional, ie that conventional diodes are used, such as ef Schottky-diodes, in the rectifier circuit. Precisely such rectifier circuit is concerned by the above-referenced patent disclosure.

Current supplies today, in particular intended for very low supply voltages—as low as at least 1V, however, typically use synchronous rectification, wherein the conventional rectifier diodes are replaced with eg MOSFET transistors that are actively controlled ON and OFF synchronously with the power stages of the converter. Such synchronous rectification involves that the power conversion becomes bidirectional and that, consequently, the current may be reversed though the converter. Hereby a number of problems arise in connection with modules connected in parallel, since they experience difficulties when it comes to distributing the electric load evenly, albeit they are provided with an active circuit, a so-called share circuit that serves the purpose of distributing the current evenly. A share circuit will always have a certain tolerance expressed in percent of the full current. In other words, supposing an exemplary accuracy of 10% and a maximum current of 100 A, an inaccuracy of +/–10 A in case of no-load operation will result.

This means that two modules that operate in parallel may share a no-load operation load by one of the modules supplying +10 A, while the other modules transmits –10 A backwards through its power stage. In theory, it is an option to such systems, but practical difficulties and financial costs most often involve that the control as such of the converters is configured exclusively for unidirectional conversion, albeit the power stage is able to convert bidirectionally. In the following a controlled transistor will be designated transistor element. A transistor element may comprise a MOSFET transistor, a bipolar transistor, etc.

In known circuits conventional rectifier diodes are replaced either by MOSFET transistors to improve performance which is, in turn, restricted by an ORing circuit of the passive kind featuring eg Schottky diode, or else an ordinary diodes rectification is used in combination with a MOSFET-ORing circuit. In broad outline, this will entail a voltage loss across at least one Schottky diode somewhere in the circuits.

Conveniently both of the most effective principles, viz MOSFET synchronous rectification and MOSFET-ORing circuits could be used in combination to minimise a voltage drop in the circuit and hence avoid a high degree of waste power. The above-described solutions do not possess the property that they use both technologies at the same time, as it is not possible to block reverse currents and currents tat are adverse to circuits.

It is therefore the object of the invention to provide a circuit, in which it is possible to block a reverse current of considerable size close to zero point, precisely like a conventional diode, thereby enabling combination of a MOSFET rectifier circuit with a MOSFET-ORing circuit which may lead to a smaller loss of voltage and hence a smaller loss of power in the overall circuit compared to prior art techniques.

According to the invention this is achieved in that a transistor element can be controlled in such a manner that a voltage drop across the transistor element is produced that was pre-selected independently of said current volume.

By controlling the transistor element in this manner a zero-crossing measurement on said transistor element can be made to be extremely precise, since measurement is made across a resistor that is determined by a fixed voltage drop divided by a relevant current load. Even with an ORing circuit intended for current loads of several hundreds of amperes, the zero-crossing accuracy becomes a few mA.

In addition to preventing a flow of a considerable size from being reversed in the circuit, the power loss of the circuit can be reduced heavily, while simultaneously it is enabled to replace such circuit in an active system during operation (hot swap).

Besides, the invention is associated with the advantage that a used regulator loop is active throughout the entire load range and therefore responds promptly to bad changes. In combination with large bandwidth this yields the quickest achievable response time to eg peak currents.

The invention presents the further advantage that the regulator loop behaves as a purely first-order system with a single pole and can be configured for having an arbitrary, high band width. It means that the regulator loop reduces the dynamic resistance of the ORing and, in principle, can cause it to be as low as about zero within a specific frequency range.

It is noted that a further advantage of the circuit according to the invention consists of the regulated voltage drop, across a number of MOSFET transistors coupled in parallel, enabling sharing of a current load, even with a direction parallel connection of the transistors without use of other circuit elements. In that case the current distribution is guaranteed by the common voltage drop that defines, in combination with the $R_{DSon}$ of the MOSFET transistors, a maximum for how much current is able to run in each separate MOSFET transistor.

By the controlled transistor element comprising a number of transistor elements interconnected in parallel, it is possible to provide a circuit that is able to transport large currents by means of ordinary and inexpensive transistor elements, since—in this configuration—they will naturally share the current among them. Provided the transistor elements are of the same type, the current will even be distributed essentially evenly among them.

By letting the transistor element comprise a MOSFET-transistor a convenient embodiment is provided, in which the interior resistance of said transistor element can be reduced compared to conventional transistors.

According to one embodiment the circuit may comprise a buffer circuit configured for operating said transistor element. Hereby the option is provided of operating a transistor element with high capacity that is to be overcome before control is possible.

By the circuit comprising a closely arranged active regulator loop configured for detecting changes in said current, it is possible to direly monitor the voltage across said transistor element and control the transistor element accurately as capacitances in the regulator loop and between same and the transistor element are minimized.

As the circuit partakes in a power supply, it is possible to provide a reliable, compact and effective power supply which is suitable for hot-swapping systems.

The invention also relates to a method of coupling a number of power-supplying modules to a common point, wherein an electronically controlled transistor element conveys current in such a manner that a pre-selected voltage drop is produced across the transistor element independently of said current value.

It will, in accordance with one embodiment of the method, be able to record a so-called fault current running through the transistor element, which may yet in turn contribute to an active interruption of the current in said transistor element.

In addition to the method preventing a current of a significant magnitude from being reversed in the controlled circuit, a power loss in the transistor element can be reduced heavily, while simultaneously it is made possible to connect such transistor element into an active system during operation.

By the transistor element according to the method comprising several transistor elements interconnected in parallel, the transistor element will allow higher passing currents.

In accordance with a method according to the invention, by providing the transistor element with at least one MOSFET transistor, the voltage loss across said transistor element will be reduced.

In accordance with a method according to the invention he transistor element is driven by a buffer circuit that will provide increased tolerance with regard to the capacity of the transistor element. This is advantageous if the transistor element is required to control a used transistor element with high capacity.

Changes to the current through the transistor element may, according to one embodiment, be detected by an active regulator loop. Positioning of the regulator loop locally in the circuit enables that the capacitances between the regulator loop and the transistor loop are minimized, whereby the spew and reliability of the regulation may be increased.

Figure 2:
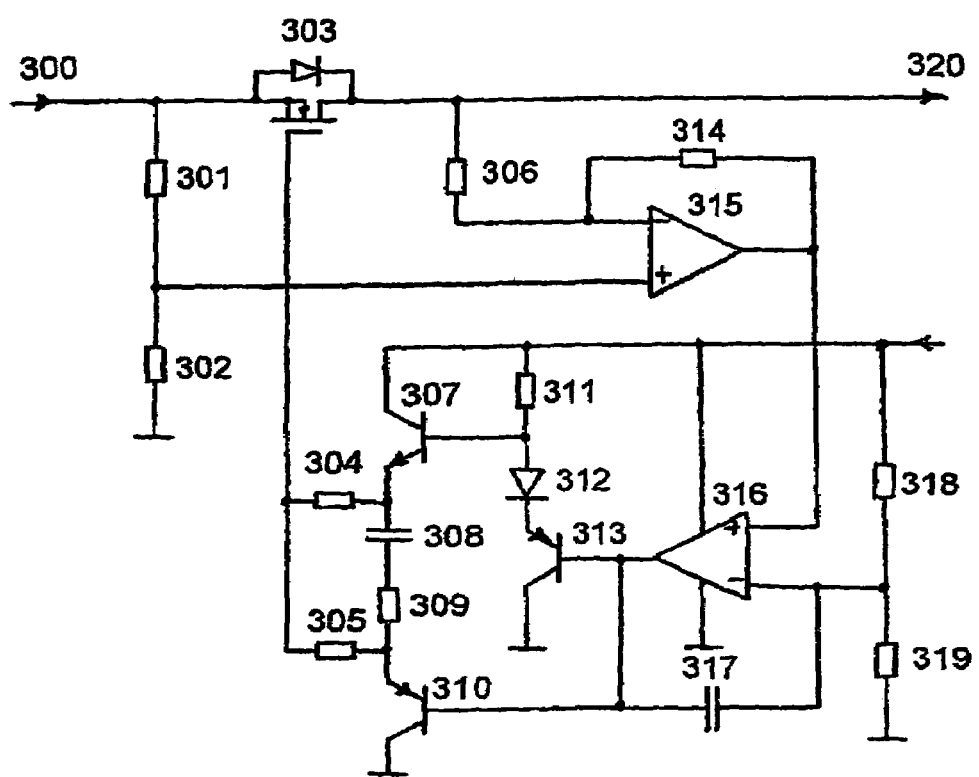
Figure 3:
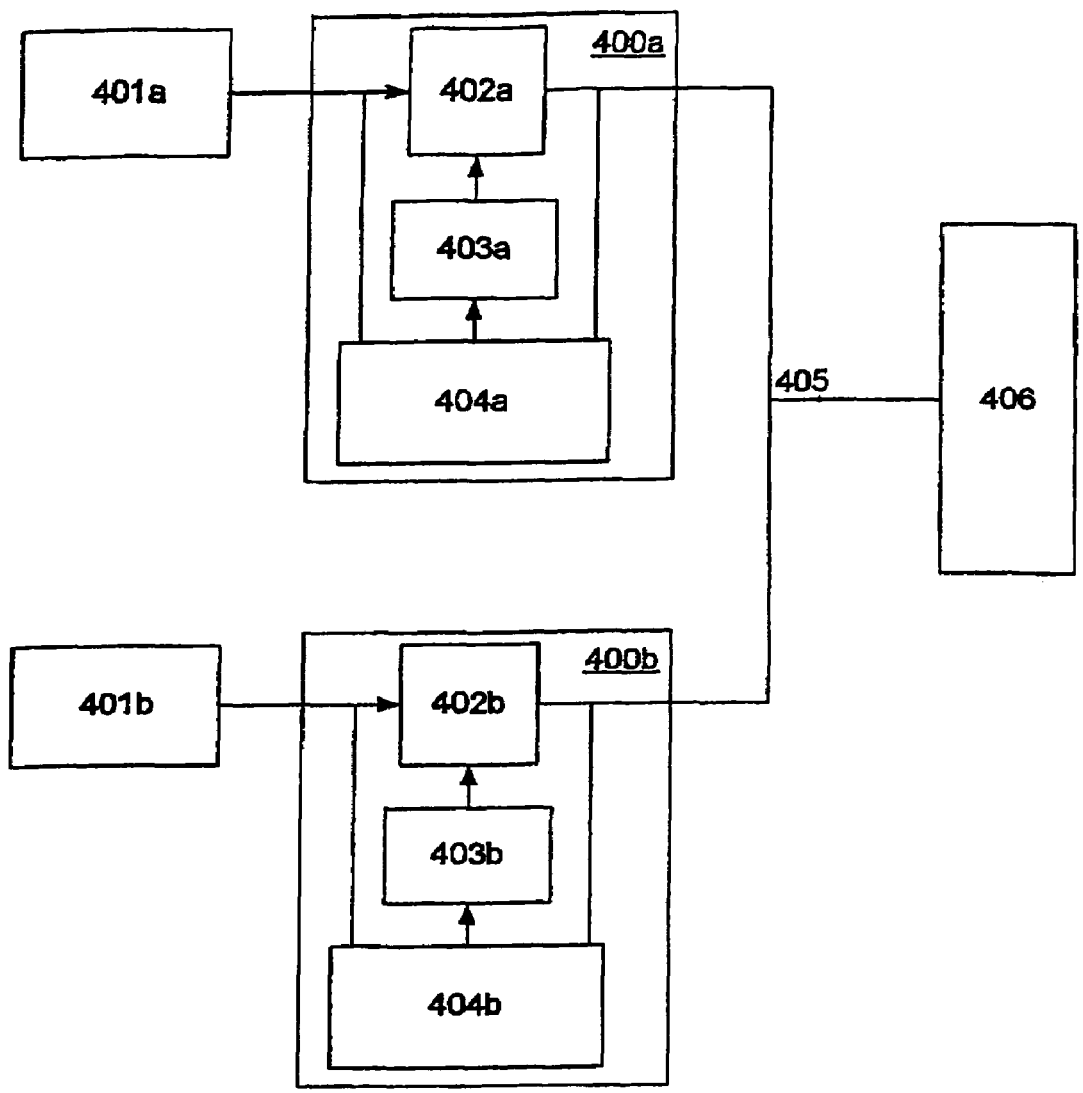

The invention will now be explained in further detail in the description that follows of exemplary embodiments as shown in the drawing, wherein FIG. 1 shows one embodiment of the circuit according to the invention;

FIG. 2 shows an alternative embodiment of the circuit according to the invention; and FIG. 3 is a schematic block diagram of two current-supplying modules connected in a common point via two circuits in accordance with the invention.

DESCRIPTION OF THE INVENTION

FIG. 1 shows an embodiment of the circuit according to the invention. An amplifier circuit (100) regulates a voltage drop across one or more MOSFET transistors connected in parallel (1, 2, . . . , N) to a fixed voltage independently of the load current. When several parallel MOSFET transistors are used, the overall capacitance can be of such magnitude that the amplifier circuit (100) is unable to drive the transistors sufficiently. In that case it may be necessary to use a buffer circuit (110) to overcome these capacitances in said MOSFET transistor elements, Since, moreover, the circuit is provided with a voltage controlled attenuator (120) that is to a certain extent able to compensate for the gain variation of the MOSFET transistor across an output range, in which the MOSFET transistors exhibit a high degree of amplification at low gate voltages, while the amplification decreases rapidly with increasing gate voltages, it is attempted with the attenuator link (120) to maintain a preferably controlled amplification within to range of operation.

The principle of the regulated voltage drop across the MOSFET transistors is associated with a number of advantages, such as:

The zero-crossing measurement becomes very precise since measurement is performed across a variable resistance which is determined by the fixed voltage drop divided by the current load current. Even with an ORing circuit intended for load currents of several hundreds of amperes, the accuracy of the zero-crossing measurement becomes a few mA.

The regulator loop is active throughout the entire load area and therefore reacts promptly to load changes. In combination with a large bandwidth, this yields the quickest possible response time to eg short-circuits internally in the supply, since the regulation need not initially be caused to leave a state of saturation in order to be able to react.

In this topology, the regulator loop behaves entirely like a system of the first order, ie with only one single dominating pole, and therefore it can be configured to have an arbitrary, high bandwidth by suitable selection of components. With the shown circuit a bandwidth of about 400 kHz is achieved in case of no-load operation and about 30 kHz in case of full load. This means that the regulator loop reduces the dynamic resistance of the ORing circuit and, in principle, it may cause it to be as low as about zero within a certain frequency range. This condition is of great significance to instantaneous load changes, the so-called load stages, since changes in voltage (transients) due to such load changes are to be kept as low as a few percent of be supply voltage, typically 10% for a full 100% change of the load current from no-load operation to full load, or from full load to load operation.

The fixedly regulated voltage loss across a large number of MOSFET transistors coupled in parallel makes it possible for them, in a reliable manner, to share the load circuit even with a direct parallel coupling of the transistors. Often it is necessary in case of analogue control of the MOSFET transistors coupled in parallel to use individual control circuits for each individual MOSFET transistor, since sharing of current between them can otherwise not be guaranteed due to varying gate threshold values. In this case current sharing is guaranteed by the common low voltage drop that will, in combination with the $R_{DSon}$ of the MOSFET transistor, define a maximum for how much can run in each individual MOSFET transistor.

The regulator loop (100) is configured as a commonly known conventional inverting amplifier circuit. In this configuration, the regulator loop may be active at all times in a non-saturated area, and therefore it will be able to regulated with a very high speed. The resistor (200) coupled to the inverting input of the amplifier circuit and the ancillary voltage Vcc of the circuit create the offset on said input that determines a level for the fixedly regulated voltage drop across the plurality of MOSFET transistors interconnected in parallel (1, 2, . . . , N). The amplifier circuit provides negative feedback by an RC-element (201, 202) via an emitter follower (210) in the buffer circuit (110) and the attenuator circuit (120). The attenuator circuit (120) has an amplification of one (unity gain) at the one end of its variation range in case of low output of the MOSFET transistors (1, 2, . . . , N). Therefore, in this part of the output range, the amplifier circuit can be viewed as a circuit in which the RC-element (201, 202) is connected directly to the output of the amplifier circuit (205).

The capacitor (202) involves a frequency compensation that is constituted by one single pole. The resistor (201) causes this pole to cease in a zero point, being in one embodiment determined to be about 300 kHz. At this frequency the output impedance of the buffer circuit (110) will, in cooperation with the gate capacitances of the MOSFET transistors (1, 2, . . . , N), form a new pole in the overall regulator loop (100). By this way of compensating it is achieved that the overall regulator loop is caused to act as one single pole within the entire frequency range used; ie an ideal way to compensate.

The buffer circuit (110) is a conventional, so-called Unity Gain buffer circuit, wherein the diode (211) in combination with the emitter follower (210), creates a temperature-compensated bias for the transistors (212,213). The shown circuit is intended for driving a very large gate capacitance that may occur ia by coupling in parallel of a plurality of MOSFET transistors. The buffer circuit comprises further transistors (214, 215) that combine with the transistors (212 and 213) to act as a Quasi-Darlington transistor circuit.

If only a few MOSFET transistors are used, to the effect that the overall gate capacitance is low, or if powerful transistors are used in the buffer circuit (110), such as specialised power transistors or the like, the transistors (214, 215) and the resistors (216, 217) may optionally be omitted and/or substituted. Likewise, its an option to alternatively use integral buffer circuit in order to ia simplify the construction and reduce the material consumption.

Resistors (218, 219) are used to determine the stand-by current in the driver stage in an entirely conventional manner, but at the same time it partakes as a determining part of the overall output impedance of the buffer, seen from the gate of the MOSFET transistor. The resistor values can be dimensioned to simultaneously comply with conflicting claims—low stand-by current that requires large resistor values and low output impedance that, conversely, requires low values—by means of an asymmetrical dimensioning, wherein the resistor (218) constitutes eg only 1.5 Ohm, whereas the resistor (219) constitutes eg 10 Ohm.

The RC-element (220, 221) is a low impedanced element that AC-wise connects the emitter circuits for the transistors (212, 213) to each other in order to thereby protect their base circuit against reverse polarisation during large signal drive.

The attenuator circuit (120) is a classic R-2R Ladder network in an embodiment with three elements, each having an attenuation of 6 dB. Thus, this yields a total attenuation of 18 dB. Coupling and decoupling of these elements is performed by the diodes (230, 231 and 232) Fat sequentially, in case of increasing voltage levels and by driving of tea MOSFET transistors (1, 2, . . . , N), connect the attenuation elements. This means that attenuation can be obtained of between 0 dB at low drive and 18 dB at full drive. This may to some extent compensate for the own gain variation, if any, of the MOSFET transistors across the drive range.

Resistors (235, 236 and 237) are all dimensioned to the same value magnitude R in the Ladder network as prescribed. Two voltage dividers (240; 241, 250; 261) are configured such that they both exhibit an impedance of the measure 2R, seen from the shared intercoupling points with the diodes (230, 231). A final voltage divider (260; 261) is configured for exhibiting an impedance of the magnitude R as required by an R-2R network.

The sequential control of the attenuator circuit (120) is achieved by this total of three voltage dividers being configured for feeding increasing voltages into the shared points with the diodes (230, 231 and 232). In one embodiment a level for the voltage divider (260; 261) of about 5V is selected, increasing to about 6.5 V for the voltage divider (250; 251) to finally constitute about 8V for the voltage divider (240; 241). The selected voltages depend on the selected MOSFET transistors and on which kind of compensation is desired. Other attenuation values than 6 dB that result from the classic R-2R concept can, of course, also be used, and, likewise, more or fewer elements can be used in the attenuator chain, if desired. Entirely different kinds of voltage-controlled attenuator circuits can perceivably be used as an alternative to the shown circuit without, however, the fundamental functioning of the invention being influenced.

Optionally the attenuator circuit (120) can be omitted altogether if a simplified version of the embodiment is desired and a throttling back of the regulator band with is acceptable. In tat case the output of the emitter follower (210) is merely connected directly to the capacitor (202).

FIG. 2 shows an alternative embodiment of the circuit according to the invention. This embodiment shows an example without ia the previously used attenuator circuit. Therefore, this circuit will be more sensitive to gain variations, if any, in the MOSFET transistor (303). Albeit only one single transistor element (303) is shown, it is possible to connect in parallel a number of such to obtain a smaller overall internal resistance in order to thereby be able to supply larger currents to a power-consuming module. The circuit of FIG. 2 also comprises a buffer stage in the form of conventional transistors (307, 310, 313), etc., for driving a large gate capacitance, if any, originating in the number of transistor elements (303).

FIG. 3 is a schematic block diagram of two power-supplying modules (401a,401b) connected in a common point via two circuits (400a/400b) according to the invention. The two power-supplying modules (401a/401b) can be eg of a rectifier-diode type, where the current on the output is rectified conventionally by means of rectifier diodes, but they may also be of said very power-saving MOSFET type that is actively controlled ON and OFF synchronously with the power stages of the module. A regulator loop (404a/404b) in the circuit according to the invention (400a/400b) continuously measures the voltage across the transistor element (402a/402b) and regulates the supply of the buffer stage (403a/403b) to the transistor element (402a/402b). The buffer stage (403a/403b)—which does not necessarily constitute a part of the circuit if the regulator loop (404a/404b) is able to drive the transistor element (402a, 402b) satisfactorily primarily with regard to the gate capacitance of the transistor element (402a/402b)—controls the power through-put in the transistor element (402a/402b) via the gate of the transistor element (402a/402b). The buffer stage (403a/403b) has an amplification of one, ie the regulator loop (404a, 404b) can be coupled directly to the gate of the transistor element (402a/402b) without further amplifier elements. The output of the transistor element (402a/402b) is connected in a common point (405) from where a common power-consuming unit (406) is connected.

As will appear, the invention may comprise a number of different embodiments without deviating from the original object of the invention; viz to create an extremely accurate, power-tolerant circuit suitable for coupling and decoupling in an active system ensured against reverse currents. It applies to both of the shown embodiments that reverse currents wall bring about a very high-speed interruption of tee MOSFET transistor elements due to the provided very high degree of measurement accuracy of the current through the circuit that will drive the gate voltages of the transistors to their OFF state.

A further advantage of the circuit according to the invention is the fact that it can easily be dimensioned to comply with individual requirements to a given application as regards its power requirements. If the number of gates of the transistor elements can be driven sufficiently quickly and powerfully, ie the buffer ages, if any, of the circuit are able to close and open the transistor elements within a desired time range and thus supply the requisite gate current, there can, in principle, be coupled in parallel a vast number of transistor elements of eg the MOSFET type, thereby transporting the desired current magnitude from the input terminal to the output terminal. Other and more powerful transistor-element types of transparent type can, of course, be used should they become available on the market.

Albeit the circuit according to the invention was primarily developed for use in connection with power supplies, the circuit can also be used for other types of systems, in which it is advantageous to be able to control and/or register large currents with very low power consumption.

Albeit preferred embodiments of the present invention have been described and shown, the invention is not limited to such; rater they can also assume other embodiments within the recitals of the following claims.

The invention claimed is:

1. A circuit configured for coupling a power-supplying module of a plurality of power supply modules to a common point, one such circuit associated with each power-supplying module of the plurality of power supplying modules to connect each power-supplying module to the common point, and wherein the circuit comprises an electronically controlled transistor element configured for conveying a current of a magnitude belonging within a predefined range, a device for detecting the direction of the current, and a control circuit configured for controlling said transistor element in such a manner that a current from the common point to one of said modules can be essentially prevented, further wherein said transistor element can be controlled in such a manner that a pre-selected voltage drop is produced across the transistor element independently of said current magnitude.

2. A circuit according to claim 1, wherein said transistor element comprises a number of transistor elements interconnected in parallel.

3. A circuit according to claim 1, wherein said transistor element comprises at least one MOSFET transistor.

4. A circuit according to claim 1, wherein the circuit comprises a buffer circuit configured for driving said transistor element.

5. A circuit according to claim 1, wherein the circuit comprises an active regulator loop configured for detecting changes in said current.

6. A circuit according to claim 1, wherein the circuit partakes in a power supply system.

7. A method of coupling a number of power-supplying modules to a common point, wherein an electronically controlled transistor element conveys a current of a magnitude belonging within a pre-defined range from a respective one of the power-supplying modules, and wherein the direction of the current is detected, and wherein a current from the common point to said module is essentially prevented by controlling said transistor element off if a current flows from the common point to the module, further wherein said transistor element is controlled in such a manner that a preselected voltage drop is provided across the transistor element independently of said current magnitude.

8. A method according to claim 7, wherein said transistor element comprises a number of transistor elements that are interconnected in parallel.

9. A method according to claim 7, wherein the transistor element comprises at least one MOSFET transistor.

10. A method according to claim 7, wherein the transistor element is driven by a buffer circuit.

11. A method according to claim 7, wherein changes in said current are detected by an active regulator loop.

12. A circuit configured for coupling a power-supplying module of a plurality of power supplying modules to a common point, one such circuit associated with each power-supplying module of the plurality of power supplying modules to connect each power-supplying module to the common point, and wherein the circuit comprises an electronically controlled transistor element configured for conveying a current of a magnitude belonging within a predefined range, a device for detecting the direction of the current, and a control circuit configured for controlling said transistor element in such a manner that a current from the common point to one of said modules can be essentially prevented, further wherein said transistor element can be controlled in such a manner that a pre-selected voltage drop is produced across the transistor element independently of said current magnitude, said control circuit having an input coupled across the transistor element and having an output coupled to a control electrode of said transistor element to maintain said pre-selected voltage drop.

13. A method of coupling a number of power-supplying modules to a common point, wherein an electronically controlled transistor element conveys a current of a magnitude belonging within a pre-defined range from a respective one of the power-supplying modules, and wherein the direction of the current is detected, and wherein a current from the common point to said module is essentially prevented by controlling said transistor element off if a current flows from the common point to the module, further wherein said transistor element is controlled in such a manner that a pre-selected voltage drop is provided across the transistor element independently of said current magnitude by monitoring the voltage drop across the transistor element and providing a feedback voltage to a control electrode of the transistor element to maintain the pre-selected voltage drop.

* * * * *